A. C. KIENLEN.
ROPE TIGHTENING DEVICE.
APPLICATION FILED JUNE 5, 1920.

1,382,366. Patented June 21, 1921.

Witness:
Stephen Rebora

Inventor.
Anna C. Kienlen
by Schunemann & Schunemann
Attys

UNITED STATES PATENT OFFICE.

ANNA C. KIENLEN, OF AURORA, ILLINOIS.

ROPE-TIGHTENING DEVICE.

1,382,366.  Specification of Letters Patent.  Patented June 21, 1921.

Application filed June 5, 1920. Serial No. 386,888.

*To all whom it may concern:*

Be it known that I, ANNA C. KIENLEN, a citizen of the United States, residing at Aurora, in the county of Kane and State of Illinois, have invented certain new and useful Improvements in Rope-Tightening Devices, of which the following is a specification.

Figure 1:
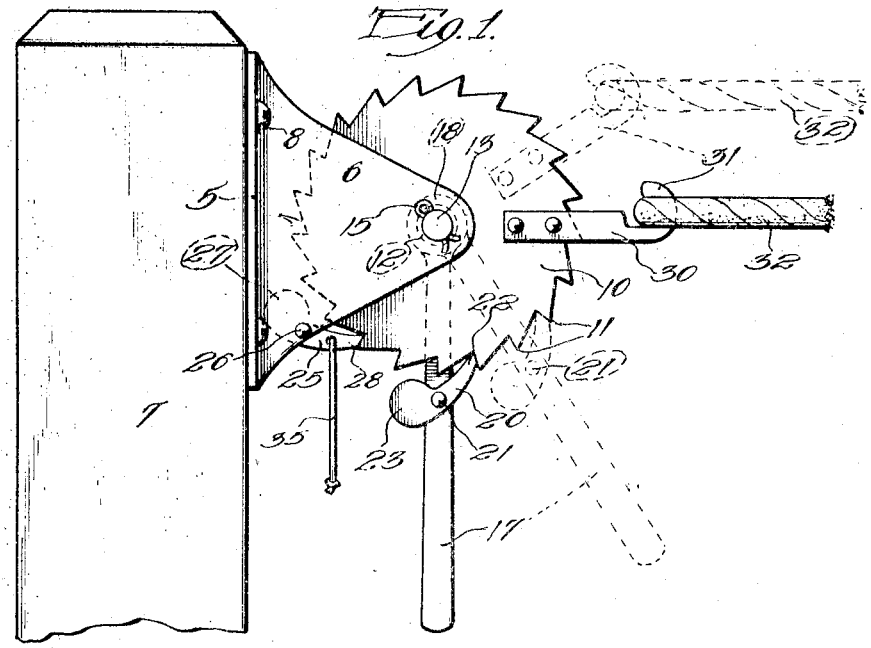

This invention relates to a simple contrivance such as may be readily used to tighten clothes lines. The features of improvement will be described in connection with the accompanying drawing, which exhibits the device in its preferred form, Figure 1 being a side elevation thereof, and Fig. 2 a plan view.

I employ a framework, preferably of metal—either stamped, cast, or otherwise formed—and consisting of a base plate 5 from which extends a pair of ears 6 in parallel and spaced relation. The frame may be conveniently attached to any fixed object, such as a post 7, screws 8, or other equivalent fastening means being suggested for this purpose.

Mounted between the ears of the frame is a wheel 10 whose periphery is formed with ratchet teeth 11. The wheel is also provided with a hub in the form of a sleeve 12 whose ends terminate adjacent the inner sides of the two ears, as clearly shown in Fig. 2.

The wheel is rotatably mounted within the frame as by means of an axle pin 13, one end of which may be formed with a head 14, the other end being apertured to receive a cotter pin 15, by means of which the axle pin is removably locked in place. The precise form of the axle pin is immaterial to this invention, however, the construction shown being merely suggested as appropriate.

The construction thus far described provides a mounting for the wheel which insures its retention in a definite position within the frame. Associated with the wheel are other elements, however, one of which is a lever 17 formed at one end with an eye 18 which is adapted to surround the sleeve 12 and occupy the space between one ear 6 and the adjacent side of the wheel. By this arrangement the lever may be swung around the axle pin 13 as an axis, but may not be moved in any other direction. A pawl 20 is pivoted to the lever as at 21, the acting end 22 of the pawl being adapted to engage with the ratchet teeth of the wheel, while its other end, designated as 23, is preferably weighted or otherwise formed to hold the pawl constantly in operative relation to the ratchet wheel.

I have also provided a second pawl, designated as 25, which is pivoted as at 26 between the ears of the frame, this pawl also being formed with a weighted end 27 which tends to throw its acting end 28 into constant engagement with the teeth of the wheel. There is also rigidly secured to the wheel in radial relation therewith an arm 30 whose outer end is formed to provide a hook 31 within which may be received a rope 32.

Figure 2:
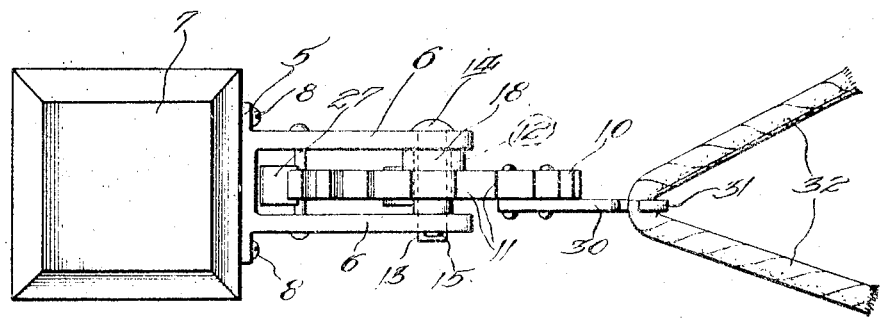

In use the present device is secured to some fixed object adjacent which one end of a line or rope is to receive support, or where the line is to be looped to take a turn, such as is indicated in Fig. 2. When the rope has been arranged in place, it may be additionally tightened by pulling the lever 16 to a position such as is represented by the dotted lines in Fig. 1, this movement causing the arm 30 to move upwardly and rearwardly in such a manner as to tighten the rope. The pawl 25 which constantly engages the ratchet teeth prevents the retraction of the wheel, so that the rope may be drawn taut to a desired degree simply by pulling upon the lever 16 to the desired extent. Whenever it is desired to slacken the line, the pawl 25 may be withdrawn from engagement with the wheel, and to facilitate such movement a wire or string 35 may be connected therewith, if desired.

According to the construction shown, the wheel is supported outwardly from the base which preferably is disposed in a vertical plane, the operating lever hangs vertically and away from the post so as to be easily grasped, the pawl 25 is carried adjacent the lower side of the wheel so as to be readily accessible of manipulation, and the hook arm is arranged for movement in an upward direction so as to elevate the line as well as draw it taut. These various features of advantage are all incorporated into a simple structure as represented in this invention.

I claim:

1. A device of the kind described comprising a base from which are extended two ears in parallel and spaced relation, an axle pin mounted between the ears at a point remote from the base, a sleeve rotatably mounted on the axle pin and extending between the two ears, a wheel carried fast by the sleeve and spaced away from one ear, a lever having one end in the form of an eye loosely carried on the sleeve in the space between the wheel and ear and adapted to move only within a single plane, ratchet teeth arranged on the periphery of the wheel, a pawl mounted on the lever having its acting end in operative relation to the ratchet teeth, a second pawl mounted between the ears adapted to present its acting end against the ratchet teeth to insure a normal one way rotation of the wheel, and a hook secured to the wheel near its periphery and adapted to engage with a rope for tightening the same as the wheel is moved under the influence of the lever, substantially as described.

2. A device of the kind described having a frame comprising a base adapted to be secured upon a vertical surface and a pair of ears laterally extended from the base in parallel and spaced relation, an axle pin carried by the ears at a point remote from the base, a ratchet wheel mounted to rotate upon the axle, means for holding the wheel away from one ear a definite distance, a lever having one end in the form of an eye loosely mounted on the axle pin within the space provided between the wheel and ear, the lever being free to move only within a single plane and normally depending in a downward direction, a pawl carried by the lever in engaging relation with the teeth of the wheel and adapted to rotate the wheel when the lever is moved away from the surface to which the base is secured, a second pawl mounted on the frame in engaging relation with the ratchet teeth adapted to normally prevent reverse movements of the wheel, and means secured to the wheel near its periphery for engaging with a rope, and operating to tighten the rope as the wheel is rotated under the influence of the lever, substantially as described.

ANNA C. KIENLEN.

Witness:
JOHN W. KAINE.